US011675081B2

(12) United States Patent
Niimura

(10) Patent No.: US 11,675,081 B2
(45) Date of Patent: Jun. 13, 2023

(54) RADAR APPARATUS

(71) Applicant: DENSO CORPORATION, Kariya (JP)

(72) Inventor: Kosuke Niimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 1128 days.

(21) Appl. No.: 16/324,418

(22) PCT Filed: Aug. 8, 2017

(86) PCT No.: PCT/JP2017/028805
§ 371 (c)(1),
(2) Date: Feb. 8, 2019

(87) PCT Pub. No.: WO2018/030420
PCT Pub. Date: Feb. 15, 2018

(65) Prior Publication Data
US 2019/0179019 A1 Jun. 13, 2019

(30) Foreign Application Priority Data
Aug. 9, 2016 (JP) .............................. JP2016-156763

(51) Int. Cl.
*G01S 17/42* (2006.01)
*G01S 7/48* (2006.01)
(Continued)

(52) U.S. Cl.
CPC .............. *G01S 17/42* (2013.01); *B60W 40/00* (2013.01); *G01S 7/4808* (2013.01); *G01S 17/93* (2013.01);
(Continued)

(58) Field of Classification Search
CPC ........ G01S 17/42; G01S 7/4808; G01S 17/93; G01S 17/931; G01S 13/931; B60W 40/00; G08G 1/167; G08G 1/168; G08G 1/16; G08G 1/165; G08G 1/166; B60Q 1/525; B60Q 1/535; B60Q 5/006; B60Q 9/002; B60Q 9/006; B60Q 9/007; B60R 21/0134
(Continued)

(56) References Cited

U.S. PATENT DOCUMENTS 5,461,357 A * 10/1995 Yoshioka .............. G01S 15/931
340/435
5,831,717 A * 11/1998 Ikebuchi ............... G01S 7/4868
356/5.1
(Continued)

FOREIGN PATENT DOCUMENTS

JP 2894055 B2 5/1999
JP 2007-139594 A 6/2007
(Continued)

Primary Examiner — Eric Blount
(74) Attorney, Agent, or Firm — Maschoff Brennan

(57) ABSTRACT

The radar apparatus includes a light emission instructing unit and a determination unit. The light emission instructing unit is configured to instruct the emission unit to emit light into the search region. Further, the light emission instructing unit is configured to reduce at least one of the number of times of emission, the emission frequency, and the emission intensity for a predetermined designated region, when the own vehicle is performing the designated movement compared to when the own vehicle is not performing the designated movement.

15 Claims, 15 Drawing Sheets

(51) Int. Cl.
  *B60W 40/00* (2006.01)
  *G01S 17/931* (2020.01)
  *G01S 17/93* (2020.01)
  *G08G 1/16* (2006.01)

(52) U.S. Cl.
  CPC ............ *G01S 17/931* (2020.01); *G08G 1/167* (2013.01); *G08G 1/168* (2013.01)

(58) Field of Classification Search
  USPC ................................................. 340/435, 436
  See application file for complete search history.

(56) References Cited

U.S. PATENT DOCUMENTS

| | | | | |
|---|---|---|---|---|
| 6,710,859 B2* | 3/2004 | Shirai | ................... | G01S 7/4868 |
| | | | | 180/169 |
| 6,856,919 B1* | 2/2005 | Bastian | ................ | G01S 17/931 |
| | | | | 250/236 |
| 9,045,080 B2* | 6/2015 | Yamamura | ............ | B60Q 1/085 |

FOREIGN PATENT DOCUMENTS

| | | | |
|---|---|---|---|
| JP | 2012-242218 A | | 12/2012 |
| JP | 2015152428 A | * | 8/2015 |
| JP | 2016-057141 A | | 4/2016 |
| JP | 2016-057176 A | | 4/2016 |
| JP | 2016057176 A | * | 4/2016 |
| JP | 2016-090268 A | | 5/2016 |

* cited by examiner

FIG.8

| MEASUREMENT ORDER | 1 | 2 | 3 |
|---|---|---|---|
| MEASUREMENT RANGE | (A1 range: perpendicular direction, measurement distance: large, amount of light: large) | (A2 range: not designated travel (normal), designated travel, measurement distance: small/large, amount of light: small/large) | (A3 range: perpendicular direction, measurement distance: large, amount of light: large) |
| MEASUREMENT RANGE | DIVIDED RANGE A1 | DIVIDED RANGE A2 | DIVIDED RANGE A3 |
| IRRADIATION INTENSITY | HIGH | HIGH OR LOW | HIGH |
| THE NUMBER OF TIMES OF LIGHT EMISSION PER DIVIDED RANGE | LARGE | LARGE OR SMALL | LARGE |

US 11,675,081 B2

RADAR APPARATUS

CROSS-REFERENCE TO RELATED APPLICATIONS

The present application is a national stage application of PCT Application No. PCT/JP2017/028805, filed on Aug. 8, 2017, which claims the priority from Japanese Patent Application No. 2016-156763 filed in Japan Patent Office on Aug. 9, 2016, and the entire contents of which are incorporated herein by reference.

TECHNICAL FIELD

The present disclosure relates to a radar apparatus.

BACKGROUND ART

PTL 1 below describes a radar apparatus that detects, at least, a distance to an object based on light which has been emitted and reflected by the object.

CITATION LIST

Patent Literature

PTL1

JP 2894055 B

PTL 1 describes an apparatus in which a measurement region is divided into a plurality of regions, and laser light is emitted from a light transmitter to each of the divided regions.

In such apparatuses, in order to improve the detection accuracy of the object within the measurement region, it is desirable to repeatedly emit the laser light within the measurement region.

However, as a result of detailed examination by the present inventor, the following problem has been found in the radar apparatus disclosed in PTL 1. The problem in brief is, in order to improve the detection accuracy of an object, it is necessary to repeatedly emit laser light to each divided region, and this leads to increase in power consumption.

SUMMARY

As one aspect of the present disclosure, it is desirable to reduce power consumption in a radar apparatus. One aspect of the present disclosure provides a radar apparatus in which light is emitted into a predetermined search region by an emission unit that emits light, light reflected by an object in response to the emitted light is received by a light receiver, and, at least, a distance to the object is detected based on the received reflected light.

The radar apparatus includes a light emission instructing unit and a determination unit. The light emission instructing unit is configured to instruct the emission unit to emit light into the search region. The determination unit is configured to acquire information showing movement of an own vehicle. Based on the information of the own vehicle, the determination unit is configured to determine whether the own vehicle is performing at least one designated movement representing the movement of the own vehicle traveling in a direction deviated from the forward direction of the own vehicle by a predetermined angle.

The light emission instructing unit is configured to reduce at least one of the number of times of emission, the emission frequency, and the emission intensity for the predetermined designated region, when the own vehicle is performing at least one designated movement compared to when the own vehicle is not performing at least one designated movement.

According to such a configuration, when the designated movement is performed, at least one of the number of times of emission, the emission frequency, and the emission intensity is reduced compared to when the designated movement is not performed. Therefore, the power consumption can be reduced in the radar apparatus.

Reference signs in parentheses mentioned in the claims indicate a correspondence relationship with specific means mentioned in an embodiment described later as an aspect of the present disclosure and do not limit a technical scope of the present disclosure.

BRIEF DESCRIPTION OF THE DRAWINGS

In the accompanying drawings:

FIG. 8 is a diagram showing the order of measurement.

DESCRIPTION OF THE EMBODIMENTS

With reference to the drawings, embodiments of the present disclosure will be described below.

[1. Embodiment]

[1-1. Configuration]

(1) Overall Configuration

Figure 1:
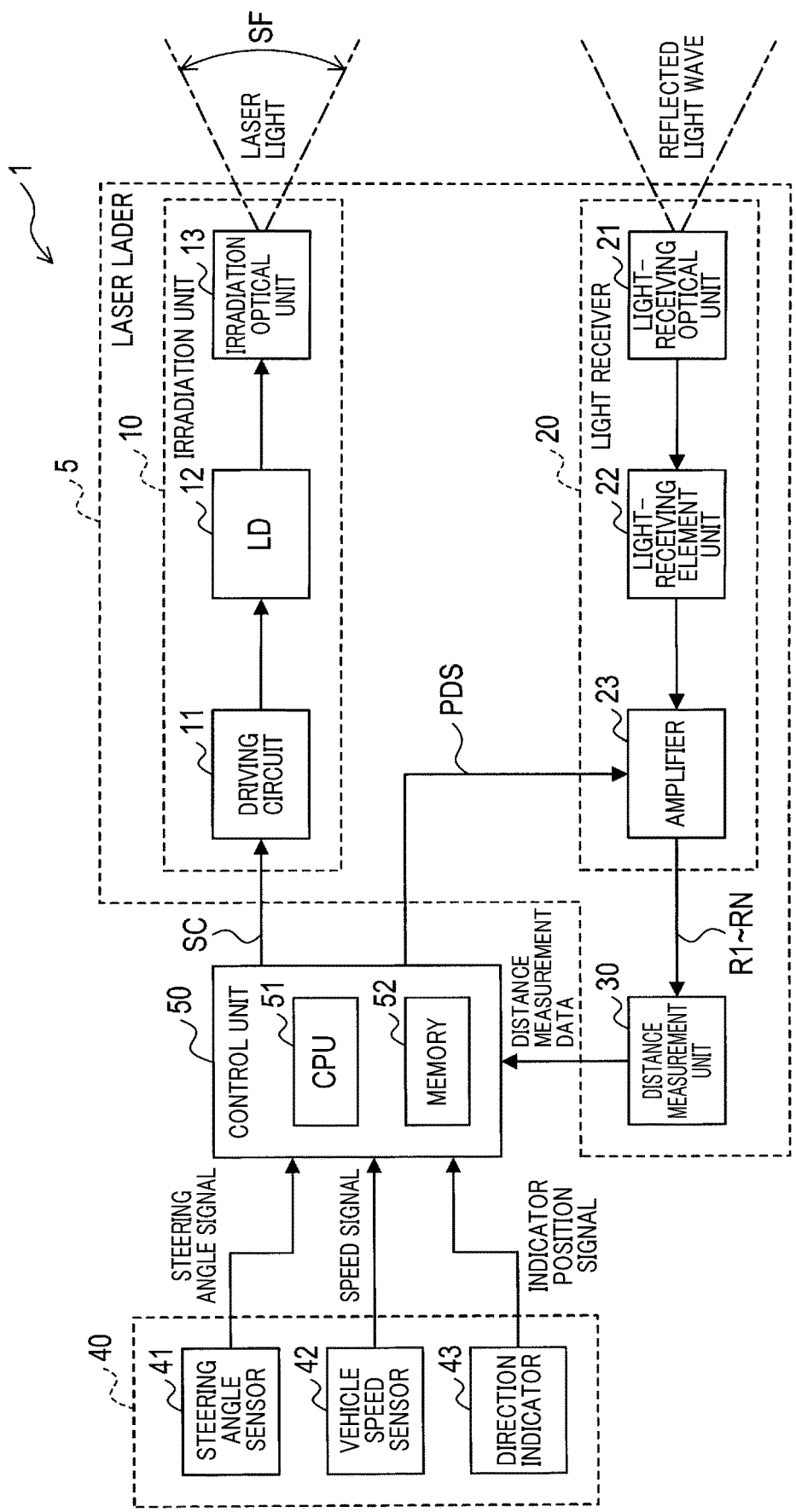
FIG. 1 is a block diagram showing a configuration of a radar apparatus according to a first embodiment.

The radar apparatus 1 shown in FIG. 1 is an apparatus mounted on a vehicle.

Hereinafter, the vehicle on which the radar apparatus 1 is mounted is also referred to as the own vehicle. As shown in FIG. 1, the radar apparatus 1 includes a laser radar 5, a control unit 50, and a sensing unit 40.

(2) Configuration of Laser Radar

Figure 2:
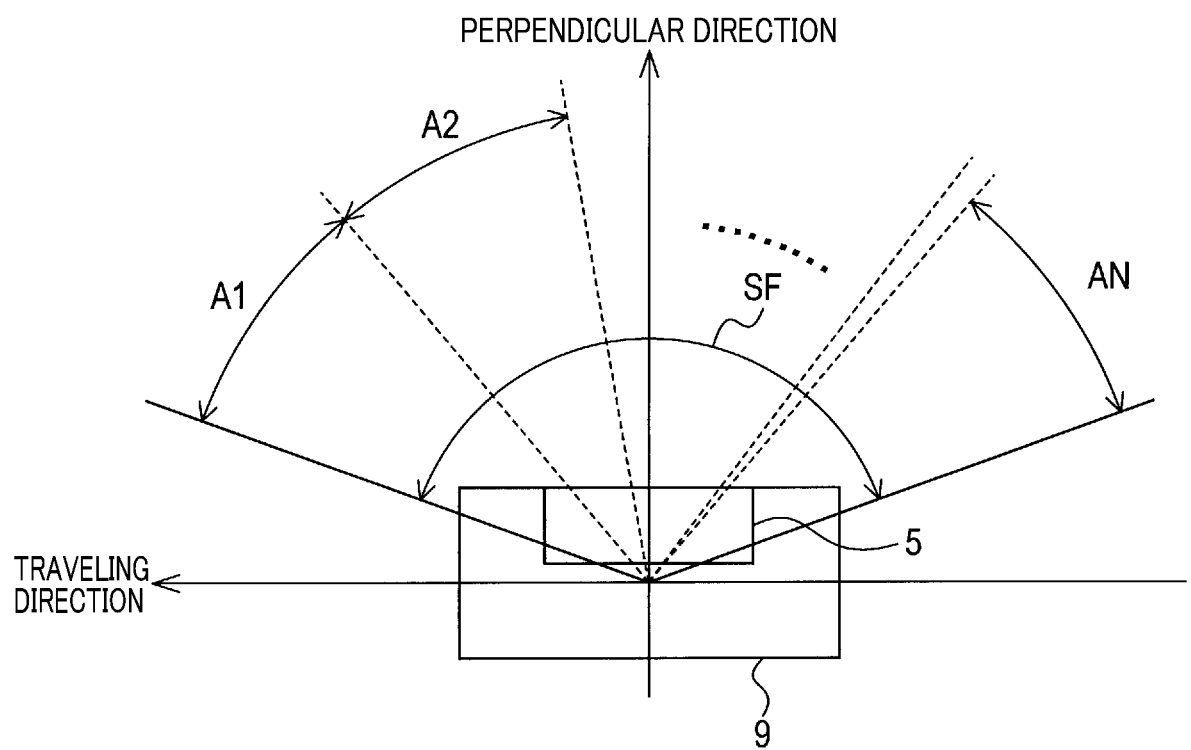
FIG. 2 is a diagram showing a search region and a divided region.

As shown in FIG. 2, the laser radar 5 is mounted near the central part of the right side surface of the own vehicle 9. Here, the right side mentioned herein refers to the right side of the own vehicle with respect to the traveling direction. As shown in FIG. 1, the laser radar 5 includes an emission unit 10, a light receiver 20, and a distance measurement unit 30.

The emission unit 10 includes a driving circuit 11, an LD 12, and an emission optical unit 13. LD is an abbreviation for laser diode, and LD denotes a light-emitting element. The driving circuit 11 drives the LD 12 in compliance with the light emission control signal SC. The light emission control signal SC is a signal indicating the transmission timing of the laser light. As will be described later, the light emission control signal SC is supplied from the control unit 50 at every predetermined detection cycle. The LD 12 is driven by the driving circuit 11 to emit pulsed laser light in accordance with the light emission control signals SC.

Figure 3:
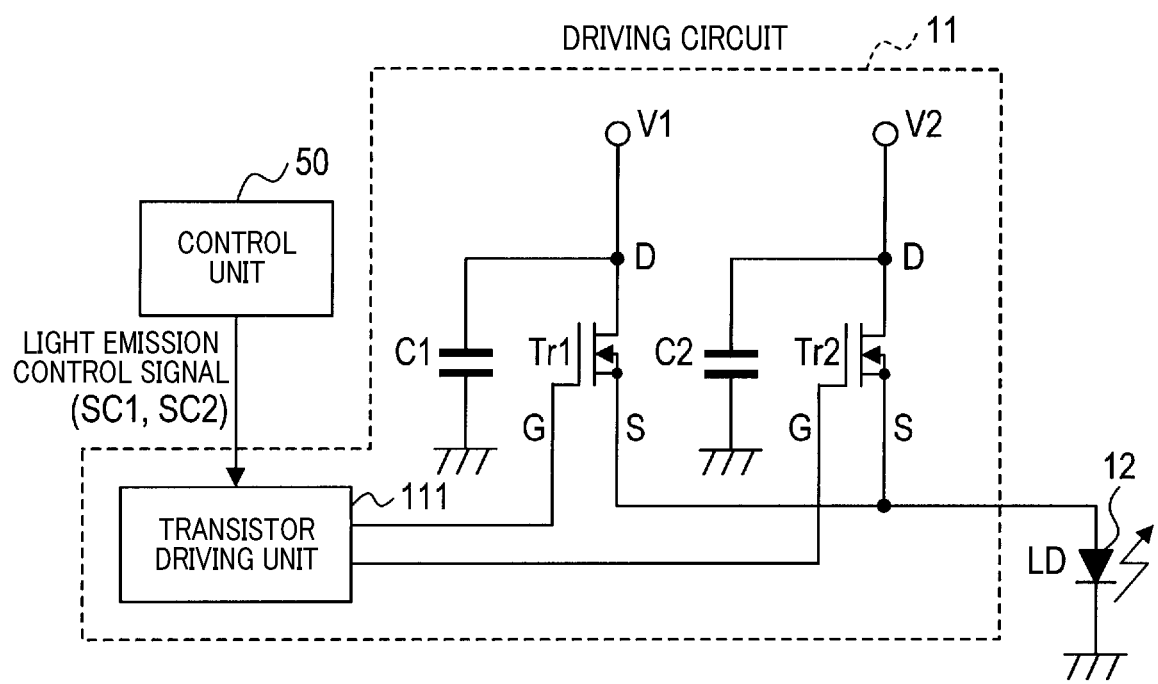
FIG. 3 is a diagram showing a configuration of a driving circuit.

More specifically, as shown in FIG. 3, the light emission control signals SC include a first light emission control signal SC1 and a second light emission control signal SC2 different from the first light emission control signal SC1. The control unit 50 is configured to output, for each detection cycle, one of the first light emission control signal SC1 and the second light emission control signal SC2. When it is not necessary to differentiate, in the explanation in the present embodiment, the first light emission control signal SC1 and the second light emission control signal SC2 from each other, these signals are simply referred to as light emission control signals SC in the following description.

The driving circuit 11 includes a transistor driving unit 111, a first capacitor C1, a second capacitor C2, a first transistor Tr1, and a second transistor Tr2. The first capacitor C1 and the second capacitor C2 have capacitances K1 and K2 which are different from each other.

The capacitance K1 is larger than the capacitance K2.

The first capacitor C1 is electrically connected in series to the LD 12 via the first transistor Tr1. When the first transistor Tr1 is in its ON-state, the first capacitor C1 and the LD 12 are in electrically conductive states, and when the first transistor Tr1 is in its OFF-state, the first capacitor C1 and the LD 12 are in electrically non-conductive states.

Similarly to the above, the second capacitor C2 is electrically connected in series to the LD 12 via the second transistor Tr2. When the second transistor Tr2 is in its ON-state, the second capacitor C2 and the LD 12 are in electrically conductive states, and when the second transistor Tr1 is in its OFF-state, the second capacitor C2 and the LD 12 are in electrically non-conductive states.

When the first transistor Tr1 is turned off, a first voltage V1 is applied to the first capacitor C1, and a charge amount Q1 is accumulated in the first capacitor C1. The charge amount Q1 is expressed as a product of the capacitance K1 and the first voltage V1. Similarly, when the second transistor Tr2 is turned off, a second voltage V2 is applied to the second capacitor C2. The charge amount Q2 is expressed as a product of the capacitance K2 and the second voltage V2.

When the first light emission control signal SC1 is inputted from the control unit 50, the transistor driving unit 111 outputs a control voltage to the transistor Tr1 to turn on the first transistor Tr1. When the first light emission control signal SC1 is inputted from the control unit 50, the transistor driving unit 111 temporarily stops the output of the control voltage to the transistor Tr2 to turn off the second transistor Tr2. When the second light emission control signal SC2 is inputted from the control unit 50, the transistor driving unit 111 temporarily stops the output of the control voltage to the transistor Tr1 to turn off the first transistor Tr1. When the second light emission control signal SC2 is inputted from the control unit 50, the transistor driving unit 111 outputs the control voltage to the transistor Tr2 to turn on the second transistor Tr2.

Figure 4:
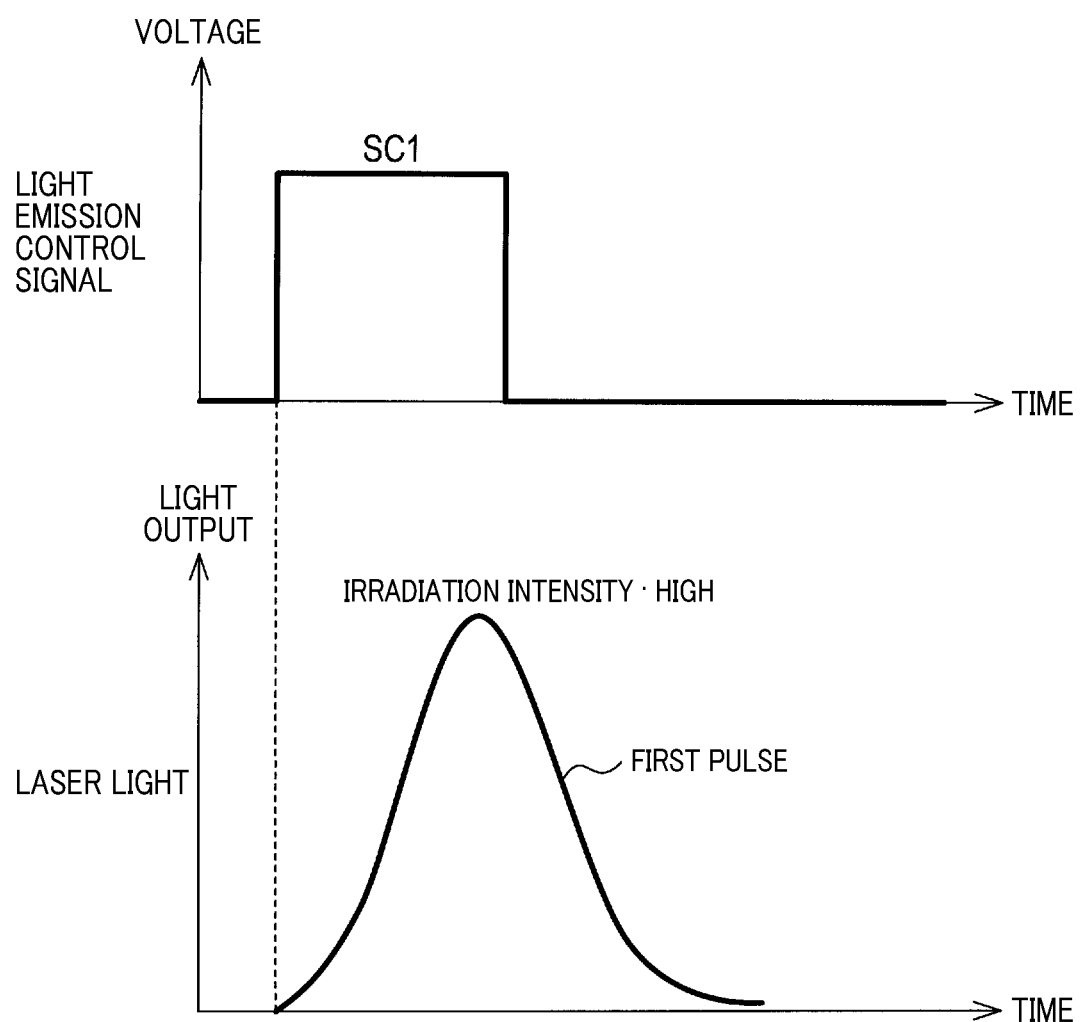
FIG. 4 is a diagram illustrating a first pulse outputted by a first light emission control signal.
Figure 5:
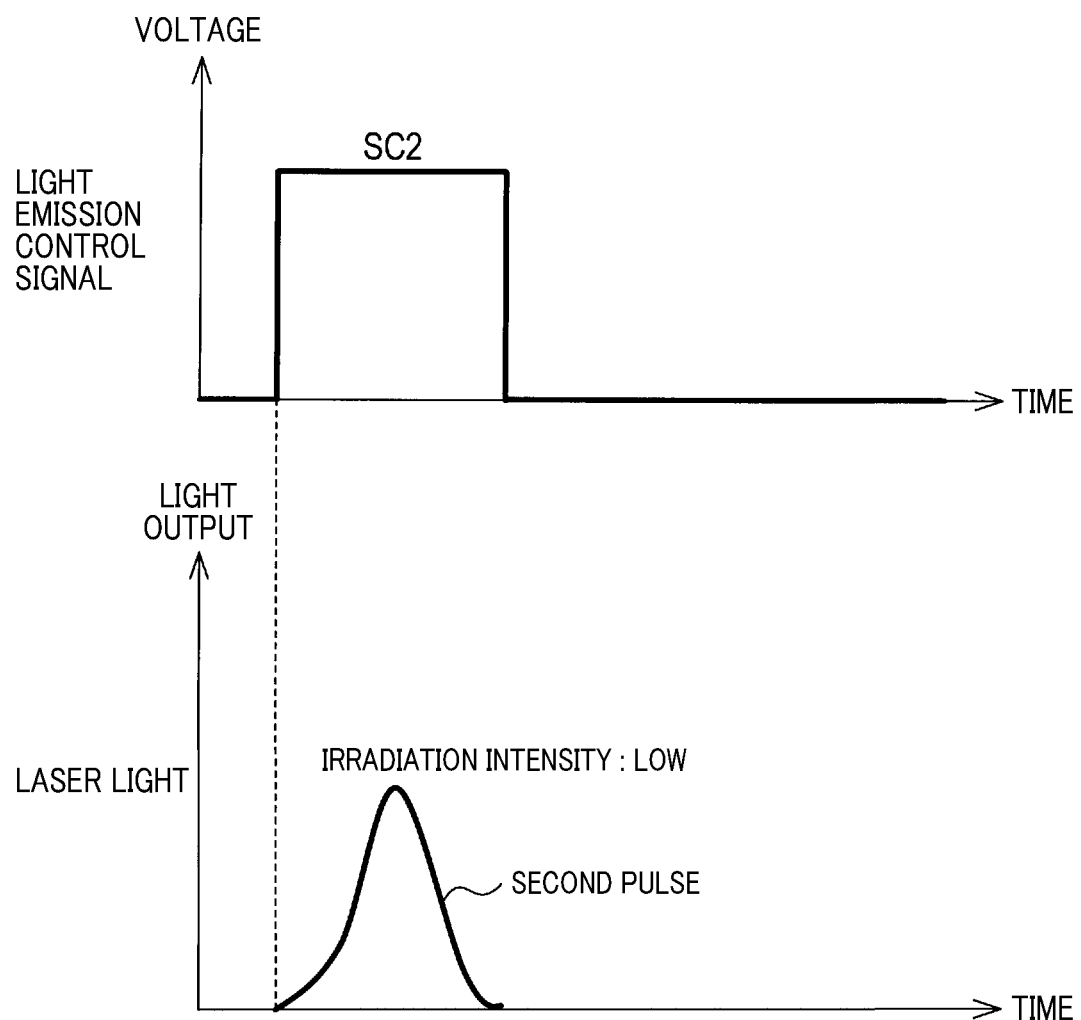
FIG. 5 is a diagram illustrating a second pulse outputted by a second light emission control signal.

That is, the first transistor Tr1 and the second transistor Tr2 are exclusively turned on and off by the first light emission control signal SC1 and the second light emission control signal SC2. Thus, as shown in FIG. 4, when the first light emission control signal SC1 is inputted from the control unit 50 to the driving circuit 11, the first pulse is outputted from the LD 12. As illustrated in FIG. 5, when the second light emission control signal SC2 is outputted from the control unit 50 to the driving circuit 11, a second pulse having a smaller emission intensity than the first pulse is outputted from the LD 12.

In this manner, the intensity of the laser light outputted from the LD 12 is switched to either a state in which a first pulse having a high emission intensity is output or a state in which a second pulse having a low emission intensity is outputted by the first light emission control signal SC1 or the second light emission control signal SC2.

Returning to FIG. 1, the description will be continued. The emission optical unit 13 includes, for example, a collimator lens, and adjusts the search region SF of the pulsed laser light emitted from the LD 12. The search region SF represents a predetermined angular region.

The search region SF can be arbitrarily determined in accordance with a mounting position of the laser radar 5 and a detection target indicating an object to be detected. Note that an object mentioned herein represents a tangible object. The tangible object may include a person, a vehicle, a building, or the like.

In the present embodiment, as described above, the laser radar 5 is attached to the right side surface of the own vehicle. Additionally, as shown in FIG. 2, the search region SF of the laser radar 5 is set to be a predetermined angular region including a direction (hereinafter, perpendicular direction) perpendicular to the traveling direction of the own vehicle.

With the aforementioned configuration, the emission unit 10 responds to the light emission control signal SC and emits the pulsed laser light toward the search region SF. As shown in FIG. 1, the light receiver 20 includes a light-receiving optical unit 21, a light-receiving element unit 22, and an amplifying unit 23.

Figure 6:
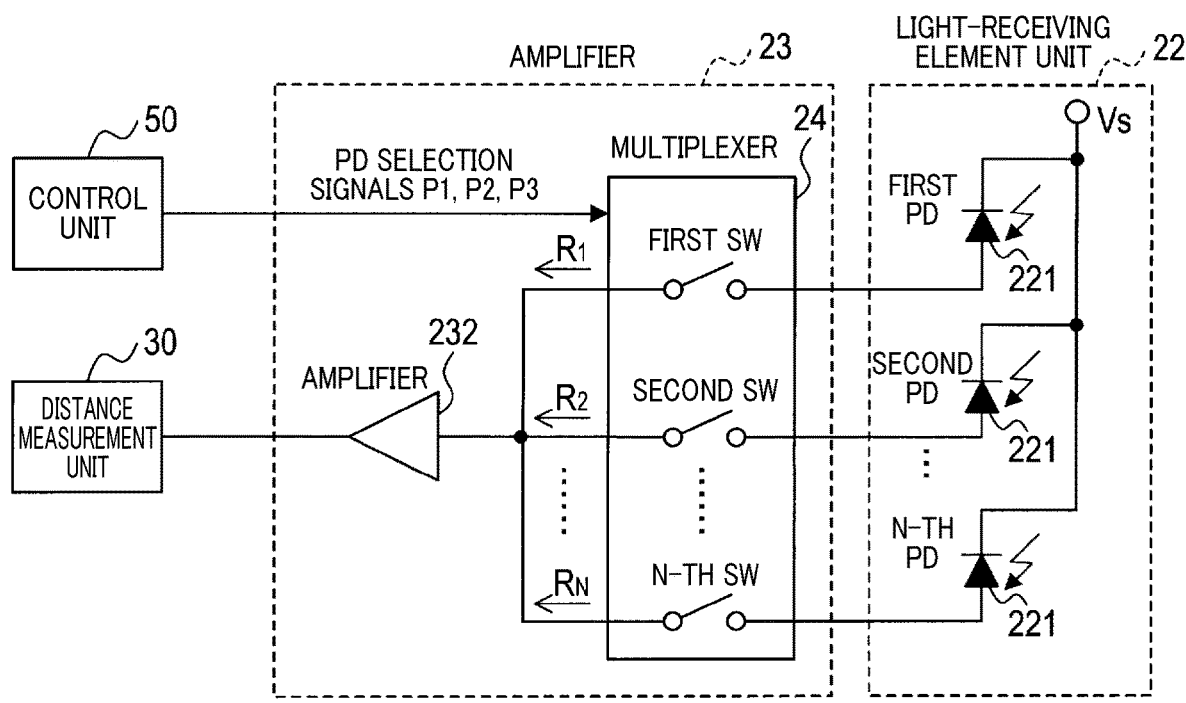
FIG. 6 is a diagram illustrating configurations of a light-receiving element unit and an amplifying unit.

The light-receiving optical unit 21 includes, for example, a light-collecting lens, and collects reflected light coming from the search region SF. As shown in FIG. 6, the light-receiving element unit 22 includes a plurality of PDs 221. The PD is an abbreviation for "Photodiode," and represents a light-receiving device. Each of the PDs 221 receives the reflected light received through the light-receiving optical unit 21 and generates a light-receiving signal having a voltage value corresponding to the intensity of the reflected light.

The number of PD 221 is equal to the number of divided regions A1 to AN. As shown in FIG. 2, the divided region indicates a region in which the search region SF is divided for each predetermined angle. That is, the number of PDs 221 is represented by a symbol N, which is a natural number. Each of the PDs 221 of N pieces outputs an assigned one of the light-receiving signals R1 to RN.

In the present embodiment, the PDs 221 of N pieces are arranged in a line along the length of the own vehicle. The PDs 29 of N pieces are arranged so as to receive reflected light coming from only one of the divided regions A1 to AN, respectively. Each of the PDs 221 of N pieces is hereinafter referred to as the i-th PD 221. This symbol "i" is represented by any value of the natural number ranging from 1 to N. Hereinafter, "i" is also referred to as a division number "i" serving as an index.

The divided regions A1 to AN are areas of N pieces generated by dividing the search region SF as described above. Hereinafter, a light-receiving signal generated in the i-th PDs 221 by the reflected light coming from the divided region Ai is referred to as a light-receiving signal Ri. For example, the light-receiving signal generated in the first PDs 221 by the reflected light coming from the divided area A1 is the light-receiving signal R1. In this manner, the light receiver 20 is configured to receive reflected light every divided region Ai.

More specifically, as shown in FIG. 6, the amplifying unit 23 includes a multiplexer 24 and an amplifier 232. The multiplexer 24 includes switches (hereinafter, abbreviated as SWs) of N pieces 25. Each of the SWs 25 of N pieces is hereinafter referred to as the i-th SW 25. The i-th SW 25 is electrically connected to the i-th PDs 221. For example, the first SW 25 is electrically connected to the first PDs 221.

The multiplexer 24 is configured to receive the PD selection signal Pi outputted from the control unit 50 so as to selectively turn on or off the i-th SW 25 corresponding to the PD selection signal Pi. For example, when the PD selection signal P1 is outputted from the control unit 50, the first SW 25 is turned on, with the result that the light-receiving signal R1 by the first PDs 221 is outputted to the amplifier 232.

Figure 9:
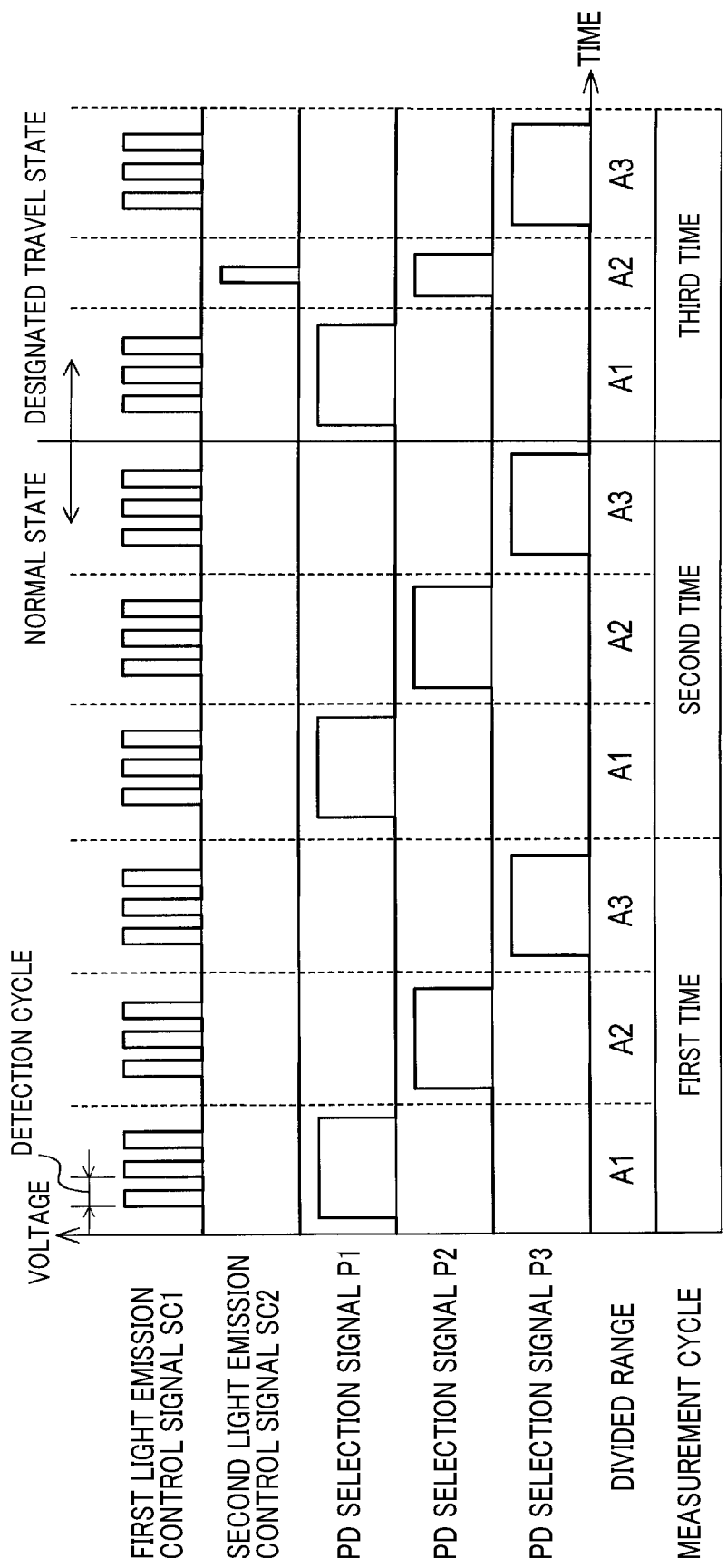
FIG. 9 is a timing chart in distance measurement.

As shown in FIG. 9 to be described later, the PD selection signals P1 to PN are outputted from the control unit 50 at different timings in the order of the division numbers "i" which is in the order of P1, P2, . . . , PN. Specifically, one of the divided regions A1 to AN is selected by the PD selection signals P1 to PN outputted from the control unit 50. Then, the light-receiving signals R1 to RN corresponding to the selected divided region are outputted from the multiplexer 24 at different timings. FIG. 9 shows an example in which a region to be divided SF is divided into three, that is, an example in which N=3.

The amplifier 232 amplifies the light-receiving signal Ri outputted from the multiplexer 24, and outputs the amplified light-receiving signal Ri to the distance measurement unit 30. According to the aforementioned configuration, the light receiver 20 receives reflected light at different timings for every divided area Ai. Then, the light receiver 20 converts the reflected light into light-receiving signals R1 to RN corresponding to the received light intensity, and outputs the reflected light.

The distance measurement unit 30 measures the intensities of the light-receiving signals R1 to RN supplied from the light receiver 20. The distance measurement unit 30 measures a time duration required for the laser light to reciprocate between the laser radar 5 and the distance measurement points for each one of the light-receiving signals R1 to RN. Such time duration is measured based on the irradiation timing of the laser light specified from the light emission control signal SC and the reception timing of the reflected light specified for each one of the received light signal R1 to RN. The distance measurement points indicate points on an object, at each of which the laser light is reflected.

Further, the distance measurement unit 30 calculates the distance (hereinafter, distance to the distance measurement points) from the laser radar 5 to the distance measurement points by using the time duration required for the laser light to reciprocate between the laser radar 5 and the distance measurement points. In addition, the distance measurement unit 30 estimates the direction of the distance measurement points (hereinafter, the direction toward the distance measurement points) with reference to the laser radar 5, depending on which of the light-receiving signals R1 to RN is received. The distance measurement unit 30 outputs, to the control unit 50, data (hereinafter, distance measurement data) including the distance to the distance measurement points and the direction toward the distance measurement points.

(3) Configuration of Control Unit

The control unit 50 is composed mainly of a known microcomputer having a CPU 51 and a semiconductor memories (hereinafter referred to as a memory 52) such as a RAM, a ROM, and a flash memory. Various functions of the control unit 50 are realized by the CPU 51 which executes a program stored in a non-transitory tangible computer-readable recording medium.

In the present example, the memory 52 corresponds to the non-transitory tangible computer-readable recording medium in which programs are stored. The method corresponding to the program is executed by executing the program. The number of microcomputers provided in the control unit 50 may be one or more.

The control unit 50 has a function of executing various types of driving support using a driving support executing unit (not shown) for executing driving support based on the distance measurement data, for example, as a function realized by the CPU 51 executing the programs. In addition, the control unit 50 has a function of controlling the irradiation unit 10 and the light-receiving unit 20, as shown in a light emission control process which will be described later.

A technique for implementing these elements, constituting the control unit 50, is not limited to be provided by software programs. Some or all of the elements may be implemented using hardware configurations including a combination of logic circuits, analog circuits, or the like.

(4) Configuration of Sensing Unit As shown in FIG. 1, the sensor unit 40 includes a steering angle sensor 41, a vehicle speed sensor 42, and a direction indicator 43.

The steering angle sensor 41 detects the steering angle of the own vehicle, and outputs to the control unit 50 a steering angle signal indicating the detected steering angle. The steering angle mentioned herein may include the magnitude and the direction of the steering angle.

For example, a steering angle sensor for measuring the steering angle of the steering of the own vehicle may be used as the steering angle sensor 41. The own vehicle travels in a direction corresponding to the steering angle of the steering. The direction corresponding to the steering angle is also referred to as the traveling direction of the own vehicle.

The vehicle speed sensor 42 is provided as a known sensor for detecting the vehicle speed of the own vehicle, and outputs to the control unit 50 a speed signal indicating the detected vehicle speed. The direction indicator 43 outputs an indicator position signal when the direction indicator 43 is operated by the driver of the own vehicle. The indicator position signal outputs to the control unit 50 an indicator position signal indicating whether there has been an operation to instruct either right direction or left direction with respect to the front of the own vehicle in its traveling direction. The forward direction mentioned herein is a direction from the central part of the own vehicle heading toward the driver's seat side.

[1-2. Process]

Next, the light emission control process executed by the control unit 50 will be described with reference to the flowchart of FIG. 7. The light emission control process is repeatedly executed when the radar apparatus 1 is turned on.

The present light emission control process is a process of supplying a light emission control signal SC to the emission unit 10 and causing the emission unit 10 to emit laser light. In the present embodiment, the light-receiving signal Ri is acquired every time the laser light is emitted. In the present light emission control process, the emission unit 10 is emitted with the laser light at every predetermined detection cycle. Further, as shown in FIGS. 8 and 9, the divided regions A1 to AN are sequentially set as the measurement regions to emit the laser light. Then, the light-receiving signal Ri is sequentially acquired a predetermined number of times.

That is, the control unit 50 repeats the process of acquiring the light-receiving signal R1 and the process of acquiring the light-receiving signal R2. The process of acquiring the light-receiving signal R1 being performed for a predetermined number of times for the divided region A1. The process of acquiring the light-receiving signal R2 being performed for a predetermined number of times for the divided region A2. Then finally, the control unit 50 acquires the light-receiving signal RN for a predetermined number of times for the divided region AN.

In particular, in the present light emission control process, the predetermined number of times is usually set to a normal value to be described later. However, when the own vehicle is performing a designated movement, the predetermined number of times is set to a designated value. The designated value which is a value smaller than the normal value for the designated region among the divided regions A1 to AN.

First, in S5, the control unit 50 performs initial setting. In the present step, the value of the counter C is set to zero. In S10, the control unit 50 increments the value of the counter C by 1.

In S15, the control unit 50 acquires the own vehicle information. The own vehicle information represents information indicating the movement of the own vehicle. The information mentioned herein may include, for example, information indicating the activation of the direction indicator 43, which will be described later, information indicating the magnitude of the steering angle of the own vehicle, information indicating the magnitude of the speed of the own vehicle, and the like indicating the direction in which the own vehicle is most probably going to travel with respect to the traveling direction. The information indicating the activation of the direction indicator 43 represents information indicating whether the direction indicator 43 is activated. The information referred herein may include information indicating whether the direction indicator indicates either right or left.

In the present embodiment, the control unit 50 acquires, as the own vehicle information, information of steering angle signal, the speed signal, and the indicator position signal. In S20, S30, and S40 described below, the control unit 50 determines whether the own vehicle is performing the designated movement based on the own vehicle information. The designated movement represents a movement of the own vehicle traveling in a direction deviated from the forward direction of the own vehicle by a predetermined angle.

The forward direction mentioned herein may include a direction in which a road on which the own vehicle is traveling continues, a direction in which a driver's seat is positioned as viewed from the central part of the own vehicle, and the like. The designated movement may include any movement such as lane changing movements, right turning movements, left-turning movements, backward movements, and the like except forward movements. Note that the predetermined angle mentioned herein can be arbitrarily determined in accordance with the designated movement, for example, about several degrees to several dozens of degrees in the case of lane change described later, or about 180 degrees in the case of backward movement.

Hereinafter, the present light emission control process will be described with respect to an example in which a movement for performing lane change is set to a designated movement. The lane change mentioned herein indicates that the own vehicle is moving from the lane in which the own vehicle is traveling to the lane located on the right side with respect to the traveling direction. The lane is an area where an own vehicle travels on a road, and indicates an area partitioned by a partition line such as a white line.

The control unit 50 may determine the movement of changing a lane as the designated movement based on, for example, the following (1) to (3).

(1) The direction indicator 43 is activated. In the present embodiment, since the laser radar 5 is set to only on the right side surface of the own vehicle, the control unit 50 determines that the activation of the direction indicator 43 indicating the right side as the movement of lane change.

(2) The steering angle is equal to or greater than a predetermined threshold value.

(3) Vehicle speed shall be equal to or greater than a predetermined threshold value.

Since the acceleration is performed when the lane change is performed, the control unit 50 may determine whether the lane change is performed based on the vehicle speed in this manner. Instead of the vehicle speed, the determination may be performed based on an acceleration indicating a rate of change of the vehicle speed in a predetermined time.

Hereinafter, an example will be described in which the control unit 50 sequentially determines (1) to (3) described above in S20, S30, and S40. However, the present embodiment will not be limited to such a configuration. The control unit 50 may determine whether the own vehicle is about to perform the designated movement based on at least one of the aforementioned (1) to (3).

In S20, the control unit 50 determines whether the direction indicator 43 is activated based on the indicator position signal. In the present embodiment, the control unit 50 can specify the direction indicated by the direction indicator 43 based on the indicator position signal. When the direction indicator 43 is activated to indicate the right side, the control unit 50 determines that the own vehicle is performing the designated movement, and the process proceeds to S65. When the direction indicator 43 is not activated, the control unit 50 proceeds the process to S30.

When the direction indicator 43 is activated, the control unit 50 may record the direction indicated by the direction indicator 43 in the memory 52, and may proceed the process to S65.

In S30, based on the steering angle signal, the control unit 50 determines whether the steering angle of the own vehicle is equal to or greater than a steering threshold value indicating a predetermined magnitude of the steering angle. The steering threshold value can be set to a value smaller than the magnitude of the steering angle when the own vehicle performs the lane change, for example, several degrees to several dozens of degrees. The steering threshold value is recorded in advance in the memory 52.

When the steering angle is equal to or greater than the steering threshold value, the control unit 50 determines that the own vehicle is performing the designated movement, and proceeds the process to S65. When the steering angle is less than the steering threshold value, the control unit 50 proceeds the process to S40.

In S40, based on the speed signal, the control unit 50 determines whether the speed of the own vehicle is equal to or greater than a speed threshold value indicating a predetermined magnitude of the speed. The speed threshold value is set to, for example, a speed of several dozens of kilometers per hour when the own vehicle is traveling on a road such as a general road or a highway. The speed threshold value is recorded in advance in the memory 52.

The speed threshold value may be set depending on road type on which the own vehicle is traveling, such as a general road or a highway. For example, the speed threshold value when traveling on a highway may be set to a value larger than the speed threshold value when traveling on a general road.

When the speed of the own vehicle is equal to or greater than the speed threshold value, the control unit 50 determines that the own vehicle is performing the designated movement, and proceeds the process to S65. When the speed of the own vehicle is less than the speed threshold value, the control unit 50 proceeds the process to S70.

In S65, the control unit 50 determines whether the present measurement region is a designated region. Here, the measurement region mentioned herein refers to the divided region Ai in which the light-receiving signal Ri selected in S90 described later is acquired. Specifically, the divided region Ai in which the value of the counter C is the division number "i" is referred to. That is, when the value of the counter C is 1, the divided region A1 corresponds to the present measurement region.

The designated region indicates at least one predetermined divided region from among the divided regions A1 to AN. In the present embodiment, the following description will be made on the assumption that, for example, the divided region A2 is predetermined as the designated region. At this time, a division number (hereinafter, a designated number) indicating a divided region to be a designated region is recorded in the memory 52 in advance. That is, in the present embodiment, 2 is recorded as the designated number.

Specifically, when the value of the counter C is equal to the designated number, the control unit 50 determines that the present measurement region is the designated region, and proceeds the process to S80. When the value of the counter C is not equal to the designated number, it is determined that the present measurement region is not the designated region, and the process proceeds to S70.

The control unit 50 sets the normal value as the number of light reception times per divided region Ai in the S70 which transitions for the following cases. In the case when the own vehicle is not performing the designated movement or in the case when the own vehicle is performing the designated movement and the present measurement region is not within the designated region. The case where the own vehicle is not performing the designated movement is also referred to as a normal state in the following description.

Here, the number of times of light reception mentioned herein indicates the number of times of receiving reflected light. That is, the number of times of light reception indicates the number of times that the light-receiving signal Ri is acquired. The normal value indicates one or more predetermined natural numbers. The normal value is recorded in advance in the memory 52. Generally, it is desirable for improving the detection accuracy of an object when the normal value is larger. However, the larger the normal value is, the increase in the power consumption, and hence, the longer the time duration required for detecting an object.

Therefore, the normal value may be predetermined for each radar apparatus 1 based on the required object detection accuracy and the time duration required for detecting an object. After setting the normal value as the number of times of light reception in the present step, the control unit 50 proceeds the process to S75.

In S75, the control unit 50 sets the emission intensity of the emitted laser light to a high level.

Setting the emission intensity to the high level indicates that the setting is set to output the first pulse. Specifically, the control unit 50 sets the first light emission control signal SC1 as the light emission control signal SC. Then, the process proceeds to S90.

The control unit 50 sets the designated value as the number of light receptions per divided region Ai in S80 for the following cases. In the case when the own vehicle is performing the designated movement and, in the case, when the present measurement region is the designated region. The designated value indicates a predetermined natural number of zero and 1 or more and a number smaller than the normal value. The designated value is recorded in advance in the memory 52. After setting the specified value as the number of times of light reception in the present step, the control unit 50 proceeds the process to S85.

In S85, the control unit 50 sets the emission intensity of the emitted laser light to low level. Setting the emission intensity to low level indicates that the setting is set to output the second pulse. Specifically, the control unit 50 sets the second light emission control signal SC2 as the light emission control signal SC.

In S90, the control unit 50 outputs the PD selection signal Pi to the multiplexer 24. As described above, "i" is a division number. In this case, the PD selection signal Pi having the value of the counter C as the division number "i" is output. The PD selection signal Pi is a control signal for turning on the i-th SW 25. As a result, the multiplexer 24 is set so that the light-receiving signal Ri corresponding to the divided region Ai is output to the distance measurement unit 30 via the amplifier 232.

In subsequent S95, the control unit 50 acquires the predetermined number of times of light reception and the light emission control signal SC. Then, the control unit 50 outputs the acquired predetermined number of times of light reception and the light emission control signal SC to the driving circuit 11. Specifically, the light emission control signal SC is repeatedly outputted for every detection cycle by the number of times of light reception. The number of times of outputting the light emission control signal SC corresponds to the number of times (hereinafter, number of times of emission) of causing the emission unit 10 to emit light.

In subsequent S99, the control unit 50 determines whether the emission of the laser light has been completed in the whole search region SF, that is, in all of the divided regions A1 to AN. Specifically, when the value of the counter C is equal to or greater than N, the control unit 50 determines that the emission of the laser light has been completed in the whole search region SF. When the value of the counter C is equal to or greater than N, the control unit 50 ends the present light emission control process. When the value of the counter C is less than N, the control unit 50 determines that the emission of the laser light has not been completed in the whole search region SF. Then, the control unit 50 makes its processing proceed to S10, and repeatedly executes the process of S10 and subsequent steps.

Note that a period required for a series of procedures for completing the emission of the laser light in the whole search region SF is referred to as a measurement cycle. The whole search region SF, that is, in all of the divided regions A1 to AN. Next, the movement of the light emission control process configured as described above will be described. Here, as shown in FIG. 8, the movement will be described for an example in which the search region SF is divided into three, that is, for an example in which N=3. The normal value is set to 3, the specified value is set to 1, and the divided region A2 of the search region SF is set to the designated region. The search region SF being composed of the divided region A1 to the divided region A3. That is, the designated region includes an area perpendicular to the traveling direction of the own vehicle.

(1) When the own vehicle is not performing the designated movement, that is, when the own vehicle is in the normal state, firstly, as shown in FIG. 9, the PD selection signal P1 for turning on the first SW 25 is outputted so that the light-receiving signal R1 from the divided region A1 is obtained. Then, the light emission control signal SC is outputted three times per detection cycle so that the light-receiving signal R1 from the divided region A1 is acquired three times as the number of times of light reception, that is, the normal value. The light emission control signal SC mentioned herein is set to the first light emission control signal SC1.

Accordingly, the first pulse having a large intensity is emitted three times to the divided region A1. Based on this emission, the light-receiving signal R1 is acquired three times. The PD selection signal P1 is continuously outputted while the light emission control signal SC is outputted three times per detection cycle. Similarly, the first pulse having a large intensity is emitted three times to the divided region A2 and to the divided region A3. Based on this emission, the light-receiving signal R2 and the light-receiving signal R3 are acquired three times. In this manner, one measurement cycle is completed.

That is, in the normal state in which the own vehicle is not performing the designated movement, the LD 12 emits light for the normal value×N times in one measurement cycle. N is the number of divided region Ai.

(2) When the own vehicle is performing the designated movement, as shown in FIG. 9, the light emission control signal SC is outputted once so that the number of times the light-receiving signal R2 from the divided region A2 is received, i.e., once, which is the designated value, is acquired for the divided region A2 which is the designated region. The light emission control signal SC mentioned herein is set to the second light emission control signal SC2.

For the divided region A1 and the divided region A3 other than the designated region, the light emission control signal is outputted three times for each detection cycle so that the light-receiving signals R1 and R3 from the divided regions A1 and A3 are respectively acquired for the number of times of light reception, that is, three times as the normal value, as in the normal case. Here, the light emission control signal is set to the first light emission control signal SC1. That is, when the own vehicle is performing the designated movement, the number of times the LD 12 emits light is less than that in the normal state in one measurement cycle.

Figure 10:
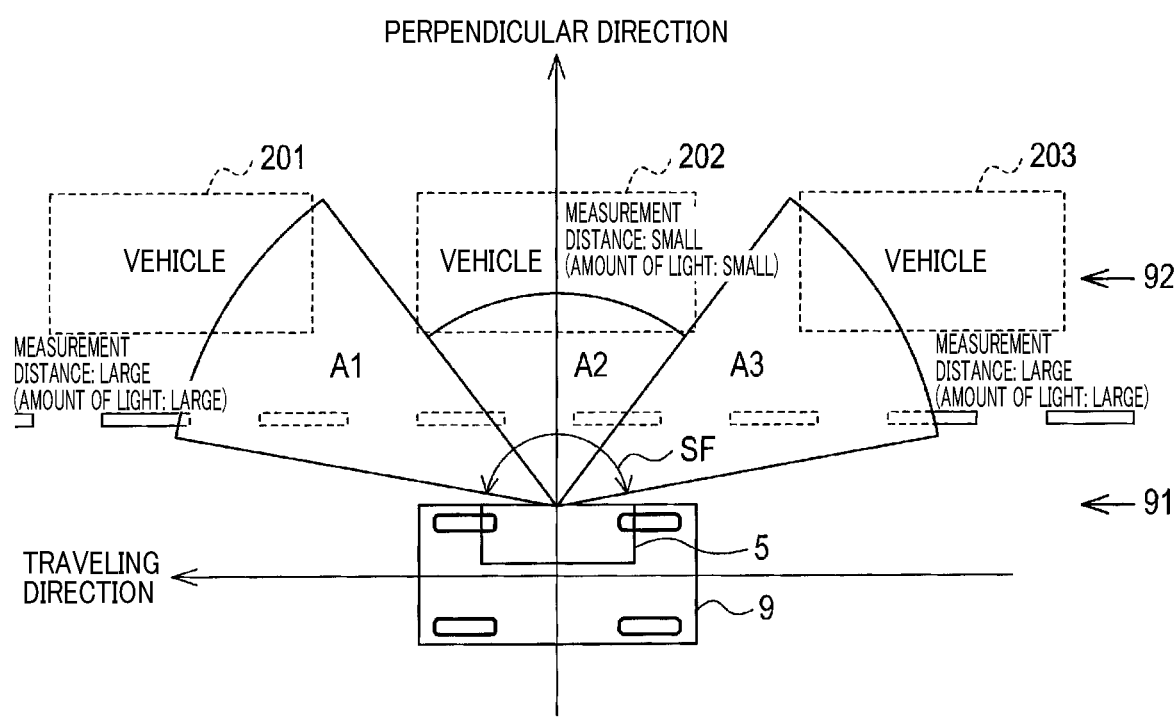
FIG. 10 is a diagram describing a measurement region.

As described above, in the present embodiment, when the movement of the own vehicle is the designated movement, the number of times of light emission is reduced compared to when the movement is not the designated movement. As shown in FIG. 10, in the case where the own vehicle is performing the designated movement, the laser light is emitted to each of the divided regions A1, A2, and A3 so that the amount of light is large for the divided regions A1 and A3 other than the designated region, in other words, the measurement distance becomes large, and the laser light is emitted for the number of times indicated by the normal value. On the other hand, the laser light is emitted to the divided region A2, which is the designated region, for the number of times indicated by the specified value such that the amount of light is small, in other words, the measurement distance is small and smaller than the normal value.

As a result, in the adjacent lane 92 which is a lane adjacent to the lane 91 on which the own vehicle travels, other vehicles 201 and 203 positioned in front of and behind the traveling direction of the own vehicle are detected with higher accuracy, and another vehicle 202 positioned almost directly beside the own vehicle are detected with lower accuracy than the other vehicles 201 and 203.

On the other hand, in the case where the own vehicle is performing a movement to change the lane as the designated movement, it is desired to accurately detect the other vehicles 201 and 203 located in the divided regions A1 and A3. This is because the other vehicle 202 located in the divided region A2, which is the designated region, are detected in the divided regions A1 and A3 other than the designated region before being detected in the divided region A2. That is, with respect to the other vehicle 202 positioned within the divided region A2, it is possible to estimate the position after the elapse of the predetermined time by using the position, the relative speed, the moving direction, and the like of the vehicle 202 detected in the divided region A1 or the divided region A3.

That is, the divided region A2 may have a lower priority when detecting an object than the divided regions A1 and A3. Here, the priority mentioned herein indicates the degree of influence on the detection result of the object. The low priority indicates that the degree of influence on the detection result of the object is small. In other words, the predetermined angular region including the central portion in the search region SF may have a lower priority when detecting an object than the end portion in the search region SF.

As described above, when the own vehicle is performing the designated movement, it is not necessarily required to detect an object with the same priority in the entire search region SF, that is, in all of the divided regions A1, A2, and A3 in the aforementioned example.

In the present embodiment, when the designated movement is performed, a divided region in which the priority for detecting an object may be low is set as a designated region, and the number of times of emitting the laser light in the designated region is reduced. In addition, the intensity at the time of emitting the laser light is lowered. In the present embodiment, since such a configuration is provided, it is possible to reduce power consumption while maintaining detection accuracy of the object in the search region SF compared to the case where the object is detected with the same priority in all the divided regions Ai constituting the search region SF.

[1-3. Effects]

The first embodiment described above in detail yields advantageous effects as follows.

(1a) The radar apparatus 1 emits light to the search region SF by the emission unit 10 that emits light, receives reflected light reflected by the object by the emitted light by the light receiver 20, and detects at least a distance to the object based on the received reflected light.

The radar apparatus 1 includes a control unit 50. The control unit 50 includes a light emission instructing unit and a determination unit. The light emission instructing unit instructs the emission unit 10 to emit light into the search region SF.

The determination unit is configured to acquire the own vehicle information and based on the own vehicle information, the determination unit determines whether the own vehicle is performing the designated movement. The light emission instructing unit is configured to reduce the number of times of emission and the emission intensity in the designated region when the own vehicle is performing the designated movement compared to when the own vehicle is not performing the designated movement.

The number of times of emission and the emission intensity are reduced when the designated movement is performed compared to when the designated movement is not performed. Consequently, the power consumption can be reduced in the radar apparatus 1. In the present embodiment, the light receiver 20 is configured to receive reflected light at different times for every divided region. The control unit 50 further includes a normal unit and a designation unit.

The normal unit is configured to set the normal value as the number of times of light reception for each divided region when the own vehicle is not performing the designated movement. The designation unit is configured to set the number of times of light reception for a designated region to the designated value and set the number of times of light reception for a divided region other than the designated region to the normal value when the own vehicle is performing the designated movement.

The light emission instructing unit is configured to cause the emission unit to emit light by the number of times of light reception set for each divided region. In the present embodiment, the designated region includes at least an area perpendicular to the traveling direction of the own vehicle. As a result, in the adjacent lane 92 which is a lane adjacent to the lane 91 on which the own vehicle travels, the other vehicles 201 and 203 positioned in front of and behind the traveling direction of the own vehicle can be detected with higher accuracy.

(1b) The own vehicle information may include information indicating the activation of the direction indicator. In the radar apparatus 1, the control unit 50 may determine that the own vehicle is performing the designated movement when the direction indicator is activated.

According to this configuration, since the configuration is provided for designating and operating that the direction indicator is activated, it is possible to reduce power consumption while maintaining detection accuracy when the direction indicator is activated. For example, it is possible to reduce power consumption while maintaining detection accuracy during lane changes.

(1c) The own vehicle information may include information indicating the steering angle of the own vehicle. In the radar apparatus 1, the control unit 50 may determine that the own vehicle is performing the designated movement when the steering angle is equal to or greater than a steering threshold value indicating the magnitude of the predetermined steering angle.

According to this configuration, since the designated movement is performed when the steering angle is equal to or greater than the steering threshold value, it is possible to reduce the power consumption while maintaining the detection accuracy when the steering angle is equal to or greater than the steering threshold value. For example, similarly to (1b), it is possible to reduce power consumption while maintaining detection accuracy at the time of lane change.

(1d) The own vehicle information may include information indicating the speed of the own vehicle. In the radar apparatus 1, the control unit 50 may determine that the own vehicle is performing the designated movement when the speed is equal to or higher than a speed threshold value indicating the magnitude of the predetermined speed.

According to this configuration, since the designated movement is performed when the vehicle speed is equal to or greater than the speed threshold value, it is possible to reduce the power consumption while maintaining the detection accuracy when the vehicle speed is equal to or greater than the speed threshold value. For example, similarly to (1b) and (1c), it is possible to reduce power consumption while maintaining detection accuracy at the time of lane change.

[2. Modifications]

In the aforementioned embodiment, the radar apparatus 1 has a configuration in which the emission unit 10 emits the entire search region SF with the laser light and the light receiver 20 receives the reflected light for each divided region Ai, that is, a collective light emission divided light-receiving system, but the configuration of the radar apparatus 1 is not limited to this.

Figure 11:
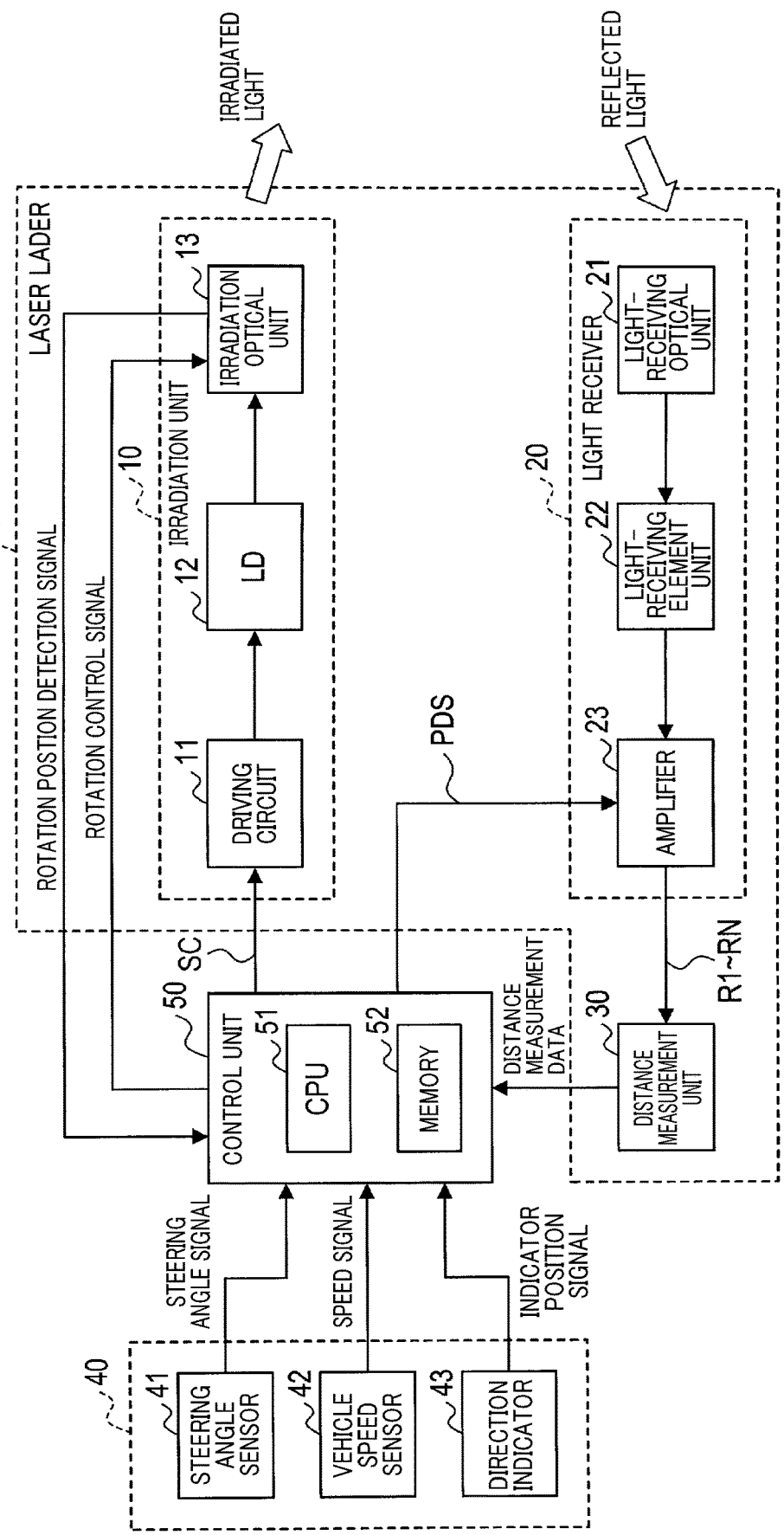
FIG. 11 is a block diagram showing a configuration of a radar apparatus according to a first modification.

(First modification) For example, as in the radar apparatus 2 shown in FIG. 11, the radar apparatus may have a configuration in which the emission unit 10 for emitting laser light, for every divided region Ai, is provided, and the light receiver 20 is configured to receive reflected light for every divided region Ai.

Specifically, in the radar apparatus 2, the control unit 50 may output a rotation control signal to the emission optical unit 13 to change the emission direction of the laser light. The emission optical unit 11 may include, for example, a polygon mirror that reflects laser light in an arbitrary direction and a drive rotating machine that drives the polygon mirror, although not shown. The rotation position detection signal indicating the rotation position of the polygonal mirror detected by the emission optical unit 13 may be outputted to the control unit 50. Since the configuration of the radar apparatus 2 is a known configuration in various documents, a detailed description thereof is omitted here.

In the first modification, the control unit 50 may be configured to perform the control in S90 and S95 so that the divided region Ai emitted with the laser light by the emission unit 10 and the divided region Ai received with the reflected light by the light receiver 20 are the same. For example, in S95 described above, the control unit 50 may be configured to output a rotation control signal to the drive rotating machine in the emission optical unit 13. The rotation control signal being a signal for rotating the polygon mirror so that the laser light is emitted to the divided region Ai.

The similar effects as those of the above embodiment can be obtained in the first modification.

Figure 12:
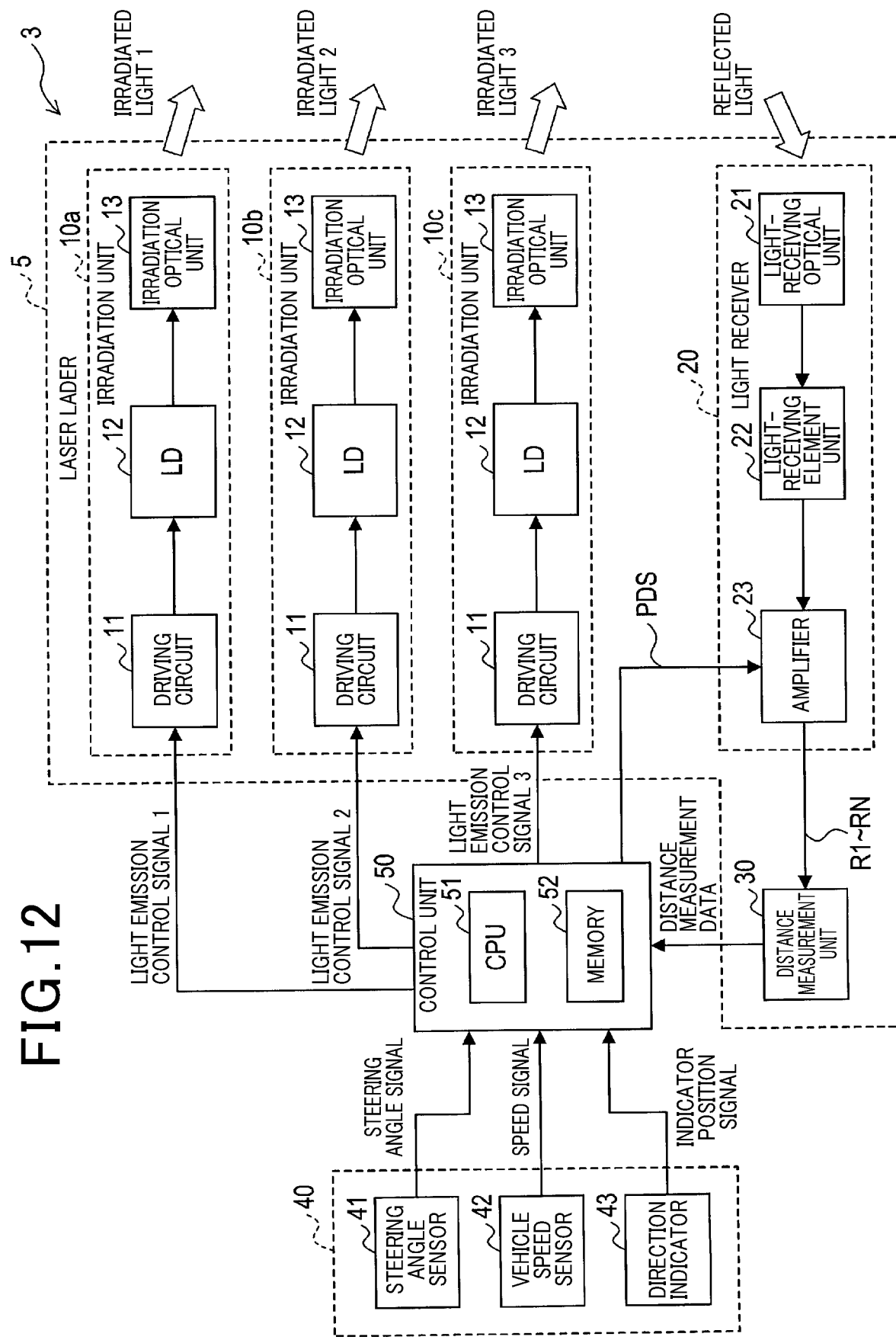
FIG. 12 is a block diagram showing a configuration of a radar apparatus according to a second modification.
Figure 13:
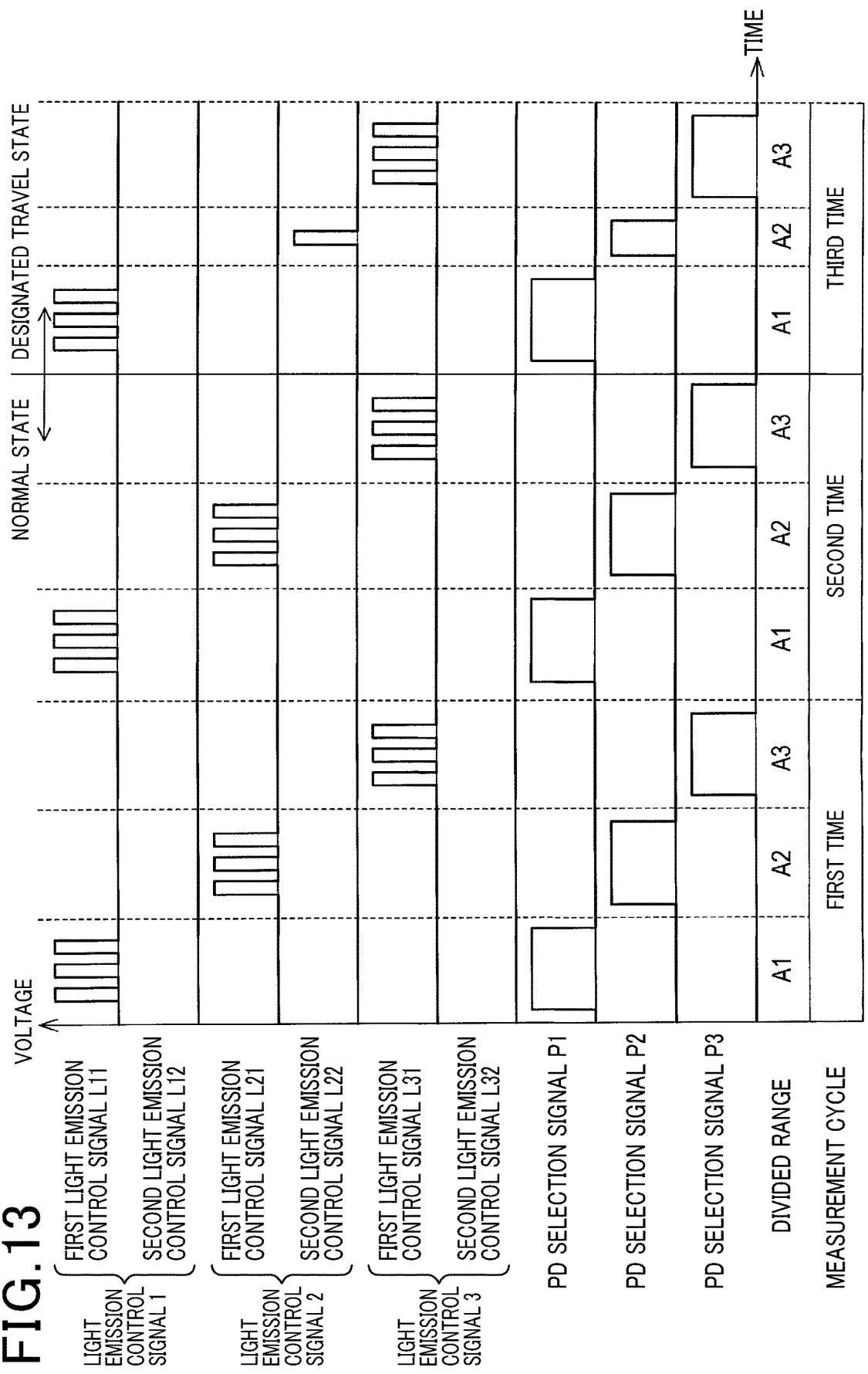
FIG. 13 is a timing chart in distance measurement of the second modification.

(Second modification) For example, as in the radar apparatus 3 shown in FIG. 12, the radar apparatus may have a configuration in which the emission unit 10 for emitting laser light is provided for every divided region Ai. FIG. 12 shows an example of N=3. FIG. 13 shows an example of a timing chart of distance measurement in the second modification. Here, the light emission control signals 1, 2, and 3 correspond to the aforementioned light emission control signal SC. The first light emission control signals L11, L21, and L31 correspond to the first light emission control signal SC1. The second light emission control signals L12, L22, and L32 correspond to the second light emission control signal SC2.

Also, in the second modification, the control unit 50 may be configured to perform control in S90 and S95 so that the divided region Ai emitted with the laser light by the emission unit 10 and the divided region Ai received with the reflected light by the light receiver 20 are the same.

The similar effects as those of the aforementioned embodiment can be obtained in the second modification.

[3. Other Embodiments]

Although the embodiments of the present disclosure have been described above, the present disclosure is not limited to the embodiments described above, and various modifications can be made to implement the present disclosure.

(3a) In the aforementioned embodiment, the radar apparatus 1 was configured to use the search region SF on the side of the own vehicle, specifically on the right side, but is not limited thereto. In the radar apparatus, for example, an arbitrary angular region in the periphery of the own vehicle, such as front, behind, left side, or the entire periphery of the own vehicle, may be set as the search region SF.

(3b) In the aforementioned embodiment, the movement to perform a lane change is determined as the designated movement, but the configuration is not limited to this. The designated movement and the designated region may be arbitrarily set. For example, when the own vehicle is located in a parking lot, a movement of moving backward to park the own vehicle in a parking space may be a designated movement. Then, for example, in the case where the entire periphery of the own vehicle is set as the search region SF, when the designated movement is performed, the radar apparatus may set the area lying in front of the own vehicle as the designated region, and may set the number of times of light reception in the front to be lower than the number of times of light reception in the area other than the front.

As a result, the power consumption can be reduced while the designated movement is being performed.

Figure 14:
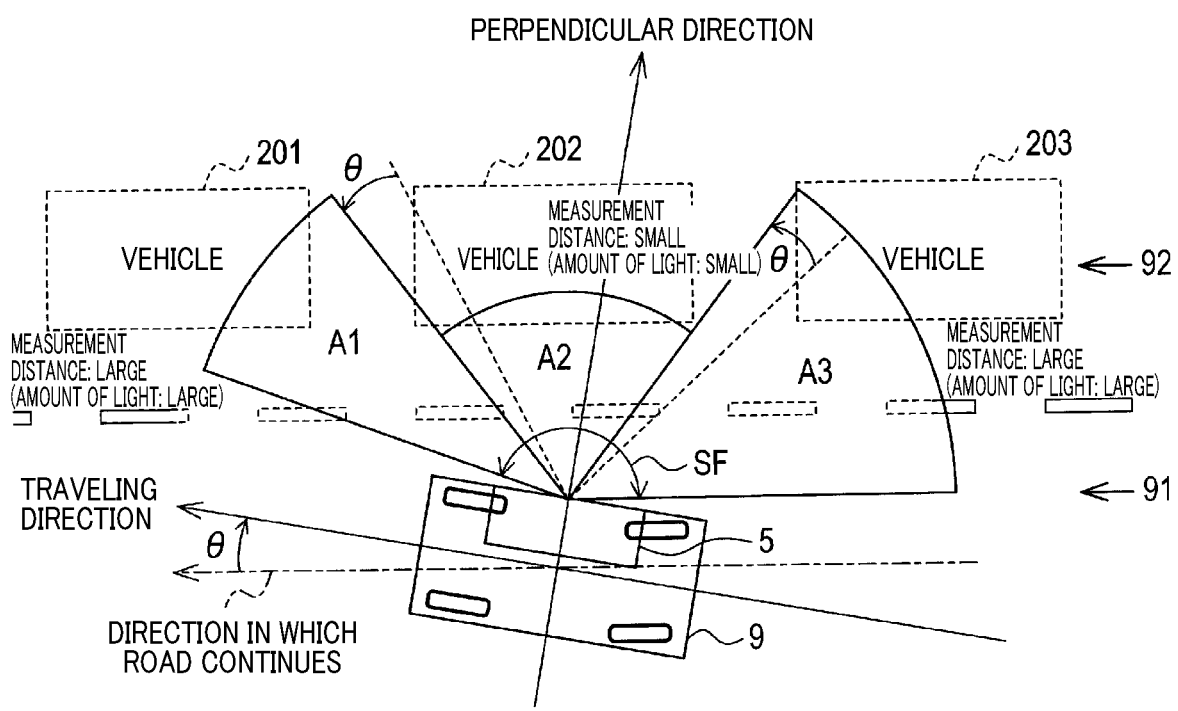
FIG. 14 is a diagram illustrating another embodiment in which the divided region is adjusted.

(3c) In the aforementioned embodiment, the radar apparatus 1 may be configured to vary the angular region of the divided region Ai according to the change in the steering angle, for example, as shown in FIG. 14 when the steering angle changes. For example, the radar apparatus 1 may be configured such that, when the steering angle changes the direction to the right by 0 degrees with respect to the direction in which the road continues, the divided region A1 is reduced by 0 degrees as the angular region, and the frontal area of the divided region A2 is increased by 0 degrees as the angular region. Furthermore, the frontal area of the divided region A3 is increased by 0 degrees as the angular region. That is, the respective divided regions may be adjusted so that the predetermined angular region is always within the designated region with respect to the direction perpendicular to the direction in which the road continues.

(3d) In the aforementioned embodiment, there is only one designated movement, but there may be more than one designated movement without limitation. Further, although the designated region is a predetermined divided region, the designated region may be set according to the designated movement without being limited thereto.

Figure 7:
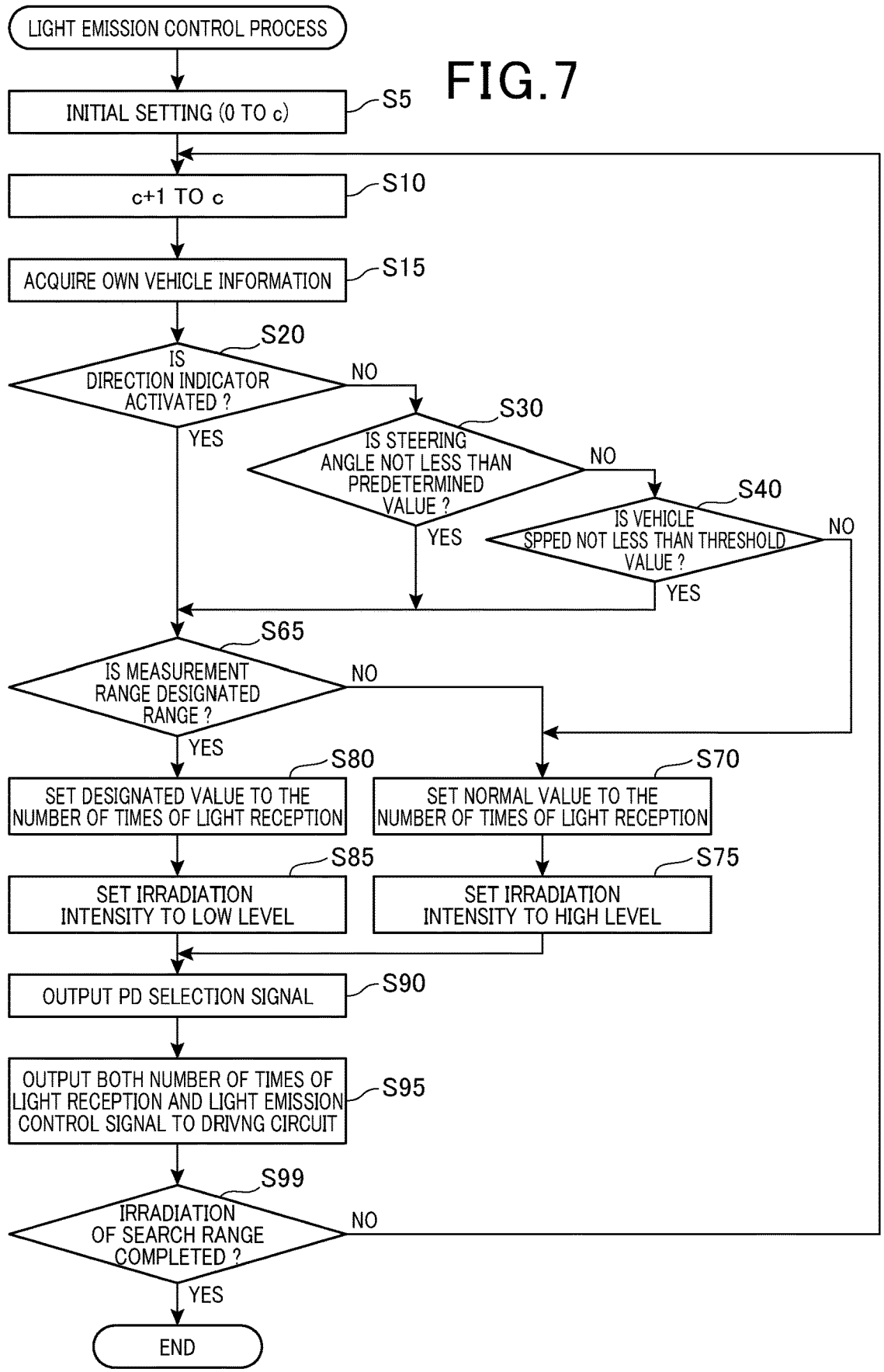
FIG. 7 is a flowchart of a light emission control process.
Figure 15:
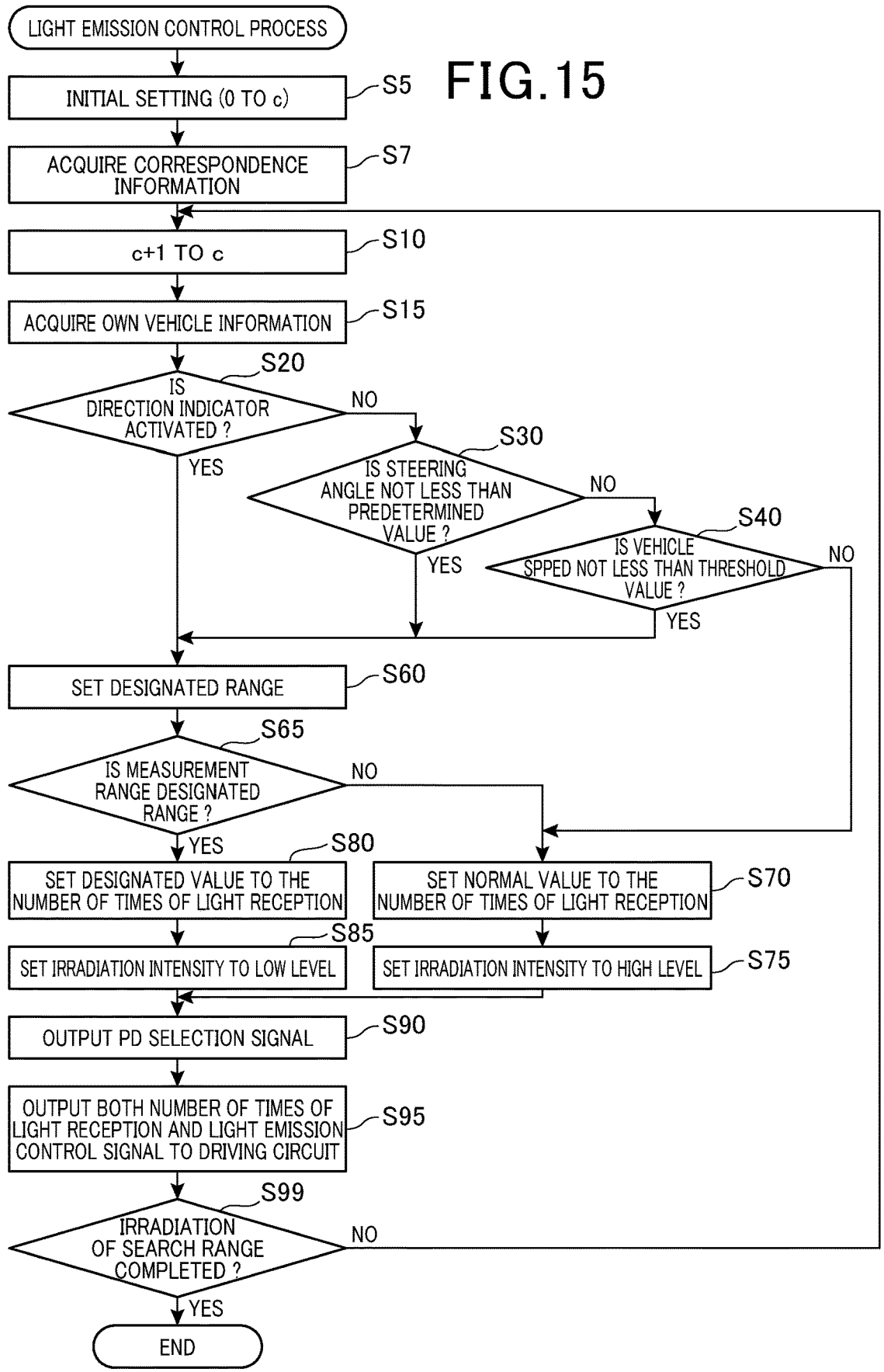
FIG. 15 is a flowchart of a light emission control process in another embodiment in which a designated region is set for each designated movement.

In this case, the control unit 50 may execute the process according to the flowchart shown in FIG. 15 in which S7 and S60 are added to the flowchart shown in FIG. 7. In the description of the flowchart of FIG. 15, only the difference from FIG. 7 will be described.

The control unit 50 may acquire the correspondence information in S7 shown in FIG. 15. The correspondence information refers to information indicating a correspondence relationship between at least one selection region and at least one designated movement for each designated movement. Here, the selection region mentioned herein indicates at least one divided region. The selection region refers to a region in which the priority for detecting an object is lower than that of a divided region other than the selection region in the designated movement.

The control unit 50 may specify the selection region corresponding to the designated movement determined in S20, S30, and S40 based on the correspondence information in S60. The process proceeds to S60 after the determination of whether the designated movement is performed in S20, S30, and S40. The selection region may be set as a designated region. Then, the process may proceed to S65.

In S80, the control unit 50 may set the number of times of light reception by using the designated value set for each designated movement. The designated value set for every designated movement may be recorded in the memory 52 in advance.

According to such another embodiment, the effects (1a) to (1d) of the first embodiment described above can be obtained, and following effects can further be obtained. In other words, in the radar apparatus 1, the control unit 50 may acquire correspondence information indicating a correspondence relationship between the selection region indicating the at least one divided region and the at least one designated movement for each designated movement. Further, when the own vehicle is performing the designated movement, the selection region corresponding to the designated movement may be specified based on the correspondence information. When the own vehicle is performing the designated movement, the number of times of light reception for the designated region may be set to the designated value of the designated region with the selected region as the designated region.

According to this configuration, since the designated region is set in accordance with the designated movement, it is possible to reduce power consumption while maintaining detection accuracy in accordance with the designated movement by appropriately setting the designated region.

(3e) Normal values may be set to different values for each divided region Ai. In this case, for example, information indicating the correspondence relationship between the normal value and the divided region Ai is recorded in advance in the memory 52, and the normal value may be specified based on the information.

(3f) In the aforementioned embodiment, the light emission instructing unit was configured to reduce the number of times of emission and the emission intensity for the designated region when the own vehicle is performing the designated movement compared to when the own vehicle is not performing the designated movement. However, the present invention is not limited thereto. The light emission instructing unit may be configured to reduce only the number of times of emission in the designated region when the own vehicle is performing the designated movement compared to when the own vehicle is not performing the designated movement. In this case, for example, S85 and S75 in FIG. 7 may be deleted.

The light emission instructing unit may be configured to reduce only the emission intensity in the designated region when the own vehicle is performing the designated movement compared to when the own vehicle is not performing the designated movement. In this case, for example, S80 and S70 in FIG. 7 may be deleted.

Further, the light emission instructing unit may be configured to reduce the emission frequency in the designated region when the own vehicle is performing the designated movement compared to when the own vehicle is not performing the designated movement. Here, the emission frequency mentioned herein represents the frequency at which the emission is performed every number of measurement cycles.

Here, when the own vehicle is not performing the designated movement, the light emission instructing unit may be configured to perform emission every measurement cycle for a region other than the designated region and the designated region. On the other hand, when the own vehicle is performing the designated movement, the light emission instructing unit may be configured to perform emission every measurement cycle except for the designated region, and emission is performed every plurality of measurement cycles in the designated region. That is, in the case where the own vehicle is performing the designated movement, the emission may not be performed for each measurement cycle in the designated region. As a result, the power consumption can be reduced depending on the designated movement.

(3g) A plurality of functions of one component in the aforementioned embodiments may be realized by a plurality of components, or a function of one component may be realized by a plurality of components. In addition, a plurality of functions of a plurality of configuration elements may be realized by one constituent element, or a single function realized by a plurality of constituent elements may be realized by one constituent element. In addition, a part of the configuration of the aforementioned embodiments may be omitted. At least a part of the configuration of the aforementioned embodiments may be added to or substituted for the configuration of the other aforementioned embodiment. Note that, the embodiments of the present disclosure correspond to all the examples encompassed within the technical idea specified by the wording of the claims.

(3h) In addition to the radar apparatuses 1, 2, and 3 and the control unit 50 described above, the present disclosure can be realized in various forms such as a program for causing the control unit 50 to function, a non-transitory tangible computer recording medium such as a semiconductor memory in which the program is recorded, and a distance detection method.

[4. Corresponding Relationship Between the Configuration of the Embodiment and the Configuration of the Present Disclosure]

In the aforementioned embodiment, the control unit 50 corresponds to a determination unit, a normal unit, a designation unit, a light emission instructing unit, a correspondence acquisition unit, and a specifying unit. Further, S20, S30, and S40 correspond to process as a determination unit, S70 corresponds to process as a normal unit, S70 and S80 correspond to process as a designation unit, and S95 corresponds to process as a light emission instructing unit. Further, S7 corresponds to a process to be performed as the correspondence acquisition unit, and S60 corresponds to a process to be performed as the specifying unit.

The indicator position signal corresponds to information indicating the activation of the direction indicator, the steering angle signal corresponds to information indicating the magnitude of the steering angle of the own vehicle, and the speed signal corresponds to information indicating the magnitude of the speed of the own vehicle. The number of times of outputting the light emission control signal SC corresponds to the number of times of emission.

What is claimed is:

1. A radar apparatus in which light is emitted into a search region by an emission unit that emits light, the light being reflected by an object in response to the emitted light being received by a light receiver, and, at least, a distance to the object is detected based on the received reflected light, the radar apparatus comprising:

a light emission instructing unit being configured to instruct the emission unit to emit light into the search region; and determination unit being configured to acquire an own vehicle information representing information indicating movement of an own vehicle, and based on the own vehicle information, the determination unit determines whether the own vehicle is performing at least one designated movement representing the movement of the own vehicle traveling in a direction deviated from a forward direction of the own vehicle by a predetermined angle, and wherein, the search region is divided into a plurality of divided regions, each of the plurality of divided regions being defined by the predetermined angle, the light receiver is configured to receive reflected light at different timings for each of the plurality of divided regions, the light emission instructing unit is configured to reduce at least one of a number of times of emission, an emission frequency, and an emission intensity for a designated region, when the own vehicle is performing the at least one designated movement compared to when the own vehicle is not performing the at least one designated movement, the designated region indicating at least one of the plurality of divided regions, and the light emission instructing unit is configured to cause the emission unit to emit light depending on the at least one of the number of times of emission, the emission frequency, and the emission intensity that is set for the designated region.

2. The radar apparatus according to claim 1, wherein the designated region includes an area perpendicular to the traveling direction of the own vehicle.

3. The radar apparatus according to claim 1, wherein the radar apparatus further comprising:

a normal unit being configured to set a normal value indicating a predetermined value, as the number of times of light reception for each of the plurality of divided regions when the own vehicle is not performing the designated movement;

a designation unit being configured to set the number of times of light reception for the designated region to a designated value, and set the number of times of light reception for a divided region other than the designated region to the normal value when the own vehicle is performing the designated movement; and the designated value indicating a value smaller than the normal value, wherein the light emission instructing unit is configured to cause the emission unit to emit light by the number of times of light reception set for each of the plurality of divided regions.

4. The radar apparatus according to claim 3, further comprising:

a correspondence acquisition unit being configured to acquire correspondence information indicating a correspondence relationship between a selection region indicating at least one of the plurality of divided regions and at least one of the designated movements for each of the designated movements; and a specifying unit being configured to specify the selection region corresponding to the designated movement based on the correspondence information when the own vehicle is performing the designated movement, wherein the designation unit is configured to set the designated value of the designated region with the selection region as the designated region.

5. The radar apparatus according to claim 1, wherein the own vehicle information includes information indicating an activation of a direction indicator, and the determination unit being configured to determine that the own vehicle is performing the designated movement when the direction indicator is activated.

6. The radar apparatus according to claim 1, wherein the own vehicle information includes information indicating magnitude of a steering angle of the own vehicle, and the determination unit being configured to determine that the own vehicle is performing the designated movement when the steering angle is equal to or greater than a steering threshold value indicating the magnitude of a predetermined steering angle.

7. The radar apparatus according to claim 1, wherein the own vehicle information includes information indicating magnitude of speed of the own vehicle, and the determination unit is configured to determine that the own vehicle is performing the designated movement when speed is equal to or higher than a speed threshold value indicating the magnitude of a predetermined speed.

8. The radar apparatus according to claim 2, wherein the radar apparatus further comprising:

a normal unit being configured to set a normal value indicating a predetermined value, as the number of times of light reception for each of the plurality of divided regions when the own vehicle is not performing the designated movement;

a designation unit being configured to set the number of times of light reception for the designated region to a designated value, and set the number of times of light reception for a divided region other than the designated region to the normal value when the own vehicle is performing the designated movement; and the designated value indicating a value smaller than the normal value, and wherein the light emission instructing unit is configured to cause the emission unit to emit light by the number of times of light reception set for each of the plurality of divided regions.

9. The radar apparatus according to claim 8, further comprising:

a correspondence acquisition unit being configured to acquire correspondence information indicating a correspondence relationship between a selection region indicating at least one of the plurality of divided regions and at least one of the designated movements for each of the designated movements; and a specifying unit being configured to specify the selection region corresponding to the designated movement based on the correspondence information when the own vehicle is performing the designated movement, wherein the designation unit is configured to set the designated value of the designated region with the selection region as the designated region.

10. The radar apparatus according to claim 9, wherein the own vehicle information includes information indicating an activation of a direction indicator, and the determination unit being configured to determine that the own vehicle is performing the designated movement when the direction indicator is activated.

11. The radar apparatus according to claim 10, wherein the own vehicle information includes information indicating magnitude of a steering angle of the own vehicle, and the determination unit being configured to determine that the own vehicle is performing the designated movement when the steering angle is equal to or greater than a steering threshold value indicating the magnitude of a predetermined steering angle.

12. The radar apparatus according to claim 11, wherein the own vehicle information includes information indicating magnitude of speed of the own vehicle, and the determination unit is configured to determine that the own vehicle is performing the designated movement when speed is equal to or higher than a speed threshold value indicating the magnitude of a predetermined speed.

13. The radar apparatus according to claim 3, wherein the own vehicle information includes information indicating an activation of a direction indicator, and the determination unit being configured to determine that the own vehicle is performing the designated movement when the direction indicator is activated.

14. The radar apparatus according to claim 13, wherein the own vehicle information includes information indicating magnitude of a steering angle of the own vehicle, and the determination unit being configured to determine that the own vehicle is performing the designated movement when the steering angle is equal to or greater than a steering threshold value indicating the magnitude of a predetermined steering angle.

15. The radar apparatus according to claim 14, wherein the own vehicle information includes information indicating magnitude of speed of the own vehicle, and the determination unit is configured to determine that the own vehicle is performing the designated movement when speed is equal to or higher than a speed threshold value indicating the magnitude of a predetermined speed.

* * * * *